United States Patent [19]

Hodgson

[11] 4,015,510
[45] Apr. 5, 1977

[54] MOUNTING FOR ROTARY MACHINE TOOL PARTICULARLY FOR GEAR HOBBING MACHINES

[75] Inventor: Brian Hodgson, Rowlands Gill, England

[73] Assignee: Charles Churchill Limited, England

[22] Filed: Nov. 7, 1974

[21] Appl. No.: 521,870

[52] U.S. Cl. .................................... 90/20.5; 90/4; 90/11 A; 279/1 ME; 279/53
[51] Int. Cl.² ...................... B23B 31/20; B23F 5/22
[58] Field of Search ............... 90/20.5, 11 A, 11 D, 90/4; 279/53, 1 ME, 39, 52, 58

[56] References Cited

UNITED STATES PATENTS

| | | | |
|---|---|---|---|
| 2,711,904 | 6/1955 | Gartner et al. | 279/1 ME |
| 3,218,706 | 11/1965 | Zankl et al. | 29/568 |
| 3,599,999 | 8/1971 | Schulzler et al. | 90/11 A |
| 3,648,563 | 3/1972 | Sollinger et al. | 90/11 A |

Primary Examiner—Othell M. Simpson
Assistant Examiner—Z. R. Bilinsky
Attorney, Agent, or Firm—Watson, Cole, Grindle & Watson

[57] ABSTRACT

A gear hobbing machine, which comprises a hobbing spindle which is supported at its outboard end in a bearing assembly attached to but removable from a supporting member and including a bearing sleeve surrounding the spindle, and means between the sleeve and the spindle which normally occupies a position in which it eliminates any significant radical play between the sleeve and the spindle but is movable to an alternative position in which it permits movement of the sleeve with respect to the spindle to enable the hob to be changed.

3 Claims, 3 Drawing Figures

MOUNTING FOR ROTARY MACHINE TOOL PARTICULARLY FOR GEAR HOBBING MACHINES

To ensure accurate production of gears by a gear hobbing machine it is necessary for the hob to be mounted rigidly and accurately. Since it is also necessary for the hob to be changed at intervals for resharpening purposes at least one of the bearings supporting the hobbing spindle must be readily removable to allow removal of the hob. It is common practice in gear hobbing machines to use a non-removable bearing to support the inboard or drive end of the spindle and to support the outboard end of the spindle in a bearing which is removable from the hob-head. The bearing at this outboard end may either be a plain bearing or a live bearing (i.e. a ball or roller bearing) and a typical example of a removable plain bearing is shown in FIG. 1 of the accompanying drawings, which is an axial cross-section showing the hobbing spindle in mounted position.

In this construction one end of the hobbing spindle A, which carries the hob B, is supported in a bearing C which is not removable from the hob-head D. The other end of the spindle A is supported in a bearing E, including a bearing sleeve G, mounted in a housing F, which may be detachably clamped to the hob-head D. To allow easy removal of the housing F from the hob-head D after it has been unclamped, there must be a certain clearance between the bearing sleeve G and the bearing E. This clearance results in a lack of rigidity of the hobbing spindle A at the bearing E and this is detrimental to the performance of the hobbing machine.

With a view to overcoming this disadvantage, the invention provides a gear hobbing machine, comprising a hobbing spindle which is supported at its outboard end in a bearing assembly attached to but removable from a supporting member and including a bearing sleeve surrounding the spindle, and means between the sleeve and the spindle which normally occupies a position in which it eliminates any significant radial play between the sleeve and the spindle but is movable to an alternative position in which it permits movement of the sleeve with respect to the spindle to enable the hob to be changed.

Preferably the sleeve has a bore tapered at its inner end and the removable bearing assembly includes a tapered collet fitted into the bore between the sleeve and the spindle, a spring urging the tapered portions of the sleeve and collet together to cause the collet to eliminate the radial play and means for overcoming the action of the spring to release the collet from the spindle.

The sleeve may be supported within a bearing housing by live bearing elements which are pre-loaded to eliminate radial clearance between the sleeve and the housing.

FIG. 1 having been discussed hereinabove as prior art, one embodiment of the invention is shown, by way of example in FIGS. 2 and 3 of the drawings.

Figure 1:
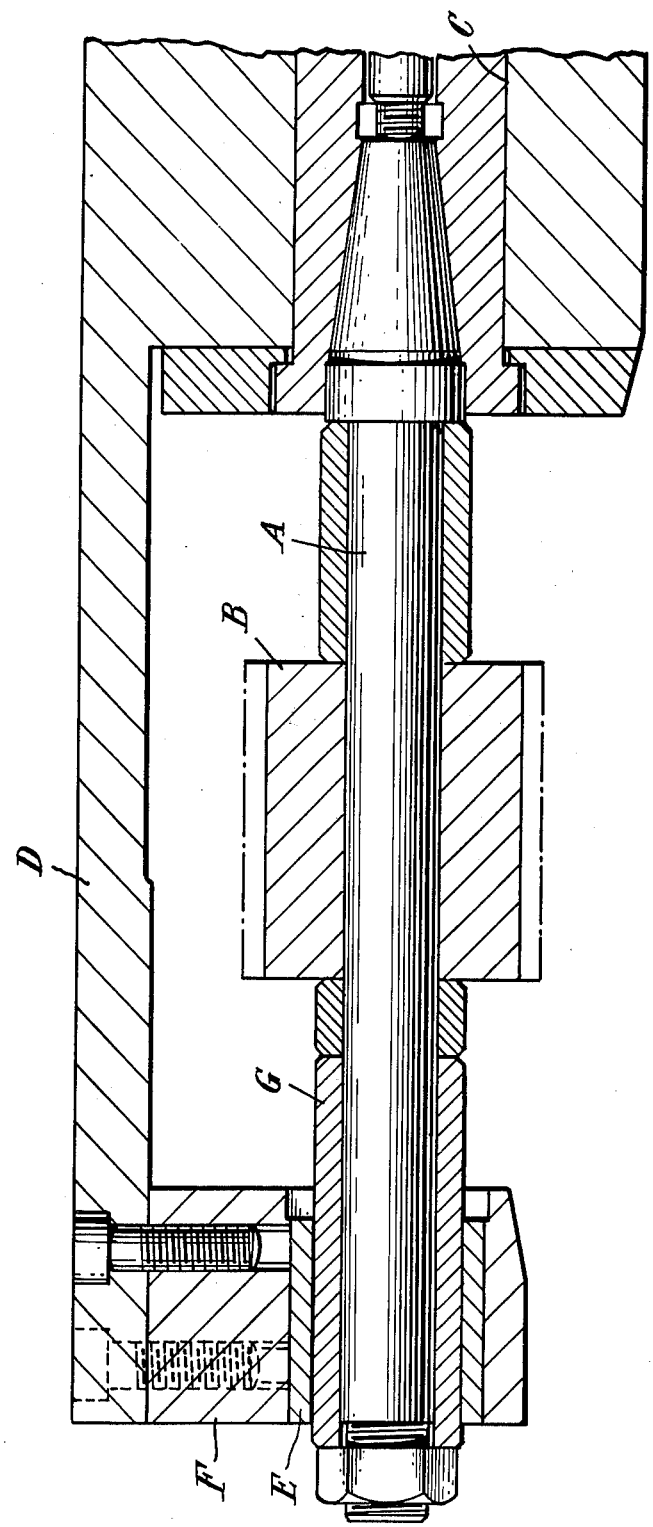
Figure 2:
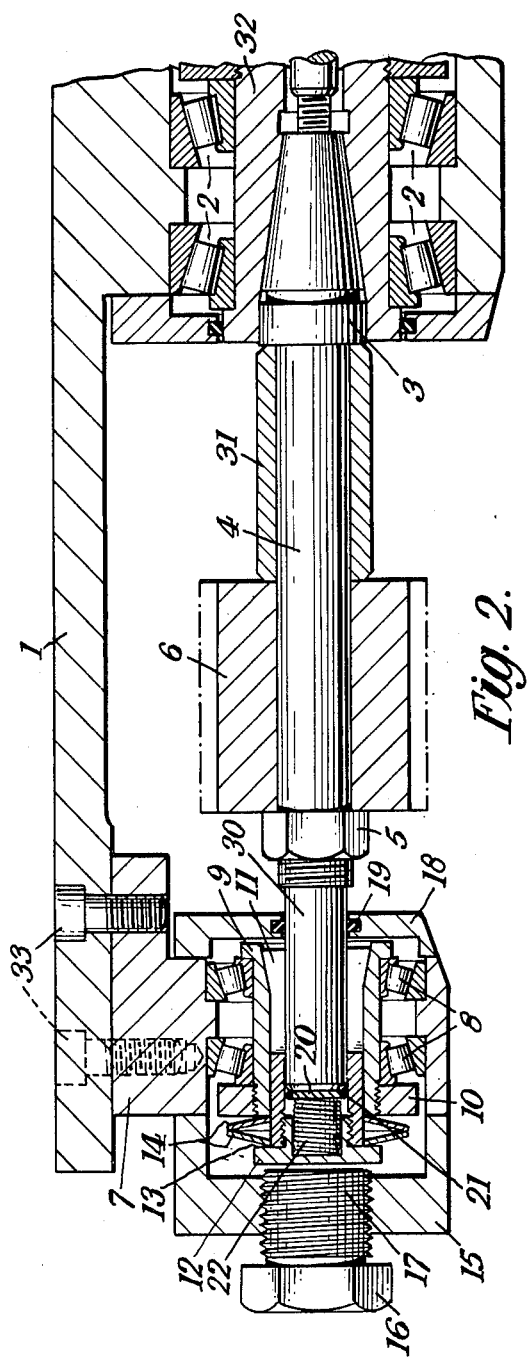
FIG. 2 is an axial section showing the hobbing spindle in mounted position.

As shown the hob-head 1 of a hobbing machine carries a hobbing spindle 4, the inboard end 3 of which is a taper fit into a drive shaft 32 mounted in a non-removable bearing 2. The spindle 4 has a cylindrical outboard end 30 which projects beyond a nut 5 which clamps the hob 6 to the spindle 4 and this projecting end 30 of the spindle is supported in a removable outboard bearing assembly. A distance piece 31 is interposed between the hob 6 and the inboard end 3 of the spindle. The outboard bearing assembly comprises a main housing 7, which is detachably clamped to the hob-head 1 by clamping screws 33 and live bearings 8 interposed between the housing 7 and a bearing sleeve 9. The bearings 8 are pre-loaded so that there is no radial clearance within the bearing and therefore no radial play between the housing 7 and the sleeve 9. This pre-loading is carried out by adjustment of a nut 10 at the outer end of the sleeve 9. The sleeve 9 has a bore which has a parallel outer portion and a tapered inner portion. Into this bore is fitted a collet 11, the outer end of which is accommodated within the parallel portion of the bore and the inner end of which fits into the tapered portion of the bore as shown. A plug 12 is screwed into the outer end of the collet 11 and disc springs 14 are interposed between a shoulder 13 on the plug and the outer end of the sleeve 9. So long therefore as the distance between the shoulder 13 on the plug 12 and the outer end of the sleeve 9 is less than the free length of the springs 14, the collet 11 will be pulled outwardly by the springs into the taper in the sleeve 9 and the collet will be closed onto the projecting end 30 of the hobbing spindle, thus eliminating any radial clearance at this point. All radial clearance is therefore eliminated within the outboard bearing and the hobbing spindle 4 is carried in a manner which eliminates all radial play and provides a rigid support at its outboard end.

Figure 3:
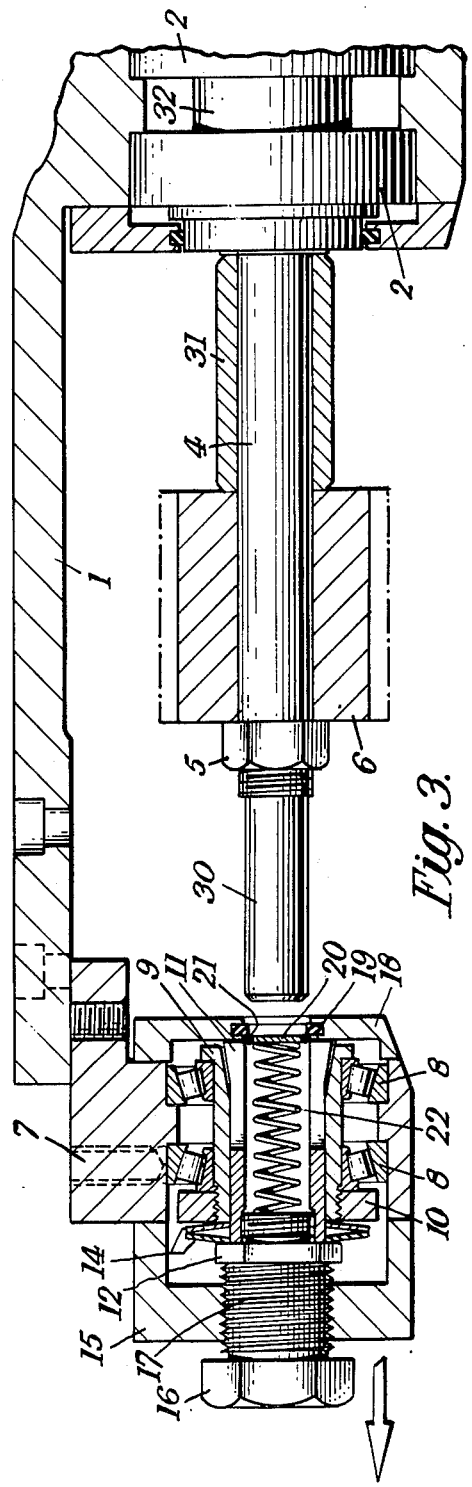
FIG. 3 is a similar view illustrating removal of the hobbing spindle from the hob-head.

The bearing housing 7 carries at its outer end an end cap 15, through the centre of which extends a screw 16. This screw may be rotated to cause its shank 17 to contact the plug 12 and when the screw is further advanced the plug 12 will be pushed inwardly to compress the springs 14 and push the collet 11 out of the taper at the inner end of the sleeve 9 thus releasing the hobbing spindle 4. To remove the hob 6 from the spindle 4 it is necessary so to advance the screw 16 to release the collet and then unclamp the housing 7 from the hob-head 1. This, as shown in FIG. 3, will allow removal of the complete outboard bearing assembly. The screw 16 may be operated by a spanner, a lever, a cam or similar mechanism.

To ensure that the hobbing spindle 4 will rotate with a high degree of accuracy it is essential that a high degree of cleanliness is maintained. This is achieved as follows. The bearing housing 7 is provided at its inboard end with an end cap 18 which carries a sealing ring 19 which fits over the portion 30 of the hobbing spindle and, while the hobbing spindle is mounted in the bearing, prevents the ingress of dirt, swarf and cutting oil. Cleanliness of the assembly when it is removed from the machine is ensured as follows. A circular pad 20 in the bore of the collet 11 carries on its circumference a seal 21 which fits into the bore of the collet. The pad 20 is urged against the end of the spindle 4 by a spring 22, interposed between the pad 20 and the plug 12. Accordingly when the complete bearing assembly is removed from the machine to the left as shown in FIG. 3, the pad 20 is maintained in contact with the end of the spindle until it is clear of the end cap 18.

In this condition movement of the pad 20 is restrained by the sealing ring 19 so that ingress of foreign matter is prevented. When the bearing assembly is again mounted in position on the machine and the portion 30 of the hobbing spindle is inserted into the bore in the end cap 18, the pad 20 is pushed back by the end of the spindle and the spring 22 is compressed again.

We claim:

1. A tool mounting for a gear hobbing machine which comprises a hobbing spindle, a hob detachably mounted on said spindle, a bearing assembly supporting the outboard end of said hobbing spindle, a supporting member and means detachably connecting said bearing assembly to said supporting member, said bearing assembly including a bearing housing, a bearing sleeve surrounding the spindle, live bearing elements interposed between the bearing sleeve and the bearing housing, wedge means between the bearing sleeve and the spindle, means urging said wedge means to a position in which it eliminates significant radial play between the bearing sleeve and the spindle, release means for moving said wedge means to an alternative position in which it permits movement of the sleeve with respect to the spindle to enable the hob to be changed, an end cap at the inboard end of the bearing housing having an aperture therethrough for the spindle to enter the bearing housing, a sealing ring in the aperture and surrounding the spindle, a pad slidably fitted within a bore of the wedge means and a spring urging the pad against the end of the spindle so that at all times the bearing housing is sealed against the ingress of foreign matter.

2. A tool mounting for a gear hobbing machine according to claim 1, wherein said bearing sleeve has a bore tapered at its inboard end, said wedge means is a tapered collet, and said urging means is a spring urging the tapered portions of the bearing sleeve and the collet together.

3. A tool mounting for a gear hobbing machine according to claim 2, wherein said spring constituting the urging means is disposed between the outboard end of said collet and a plug fitted into the outboard end of the collet and said release means is a screw mounted in said bearing housing and operable to advance said plug and compress said spring to push said collet out of the taper in the bore of the bearing sleeve.

* * * * *